No. 772,486. Patented October 18, 1904.

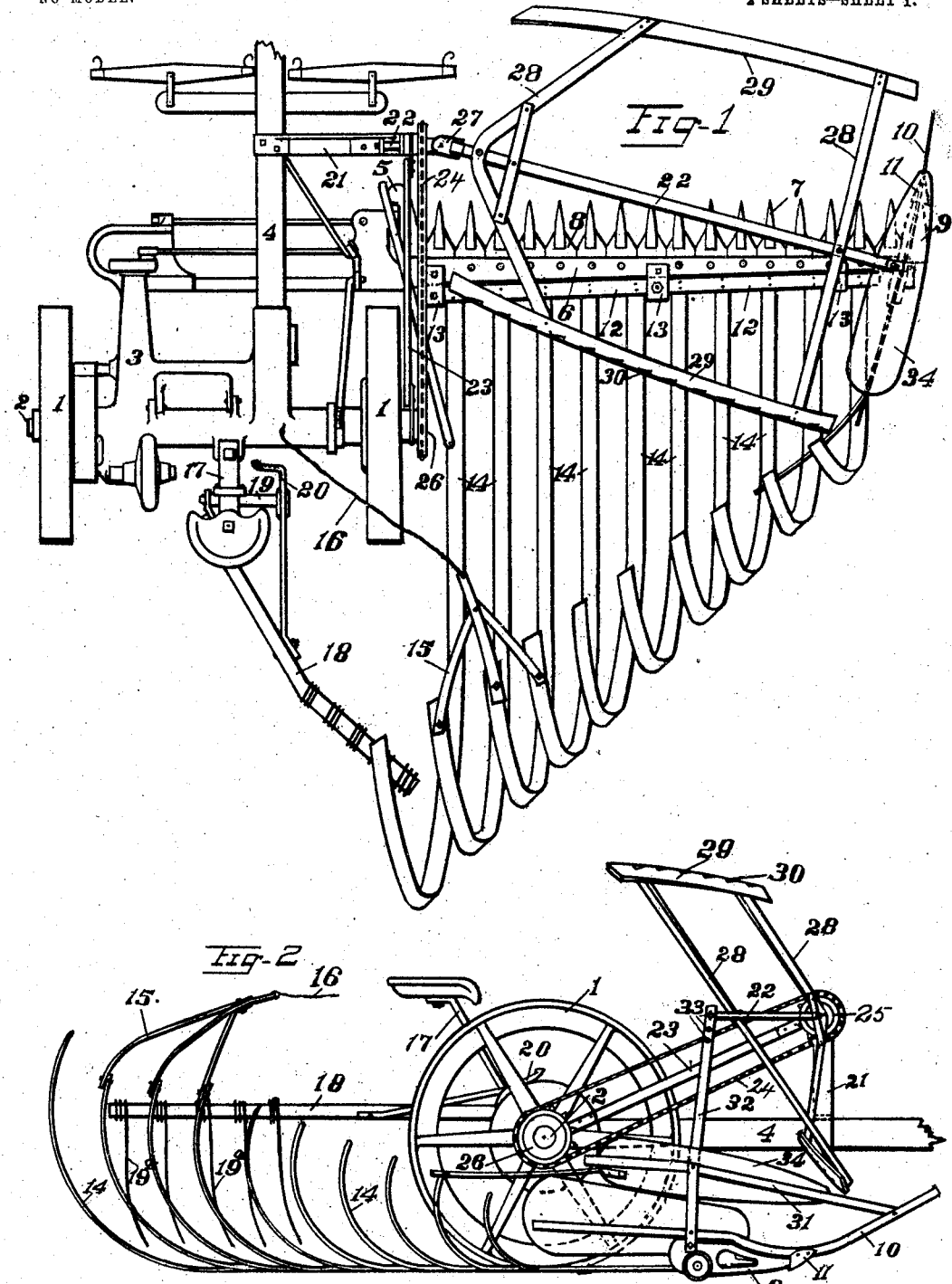

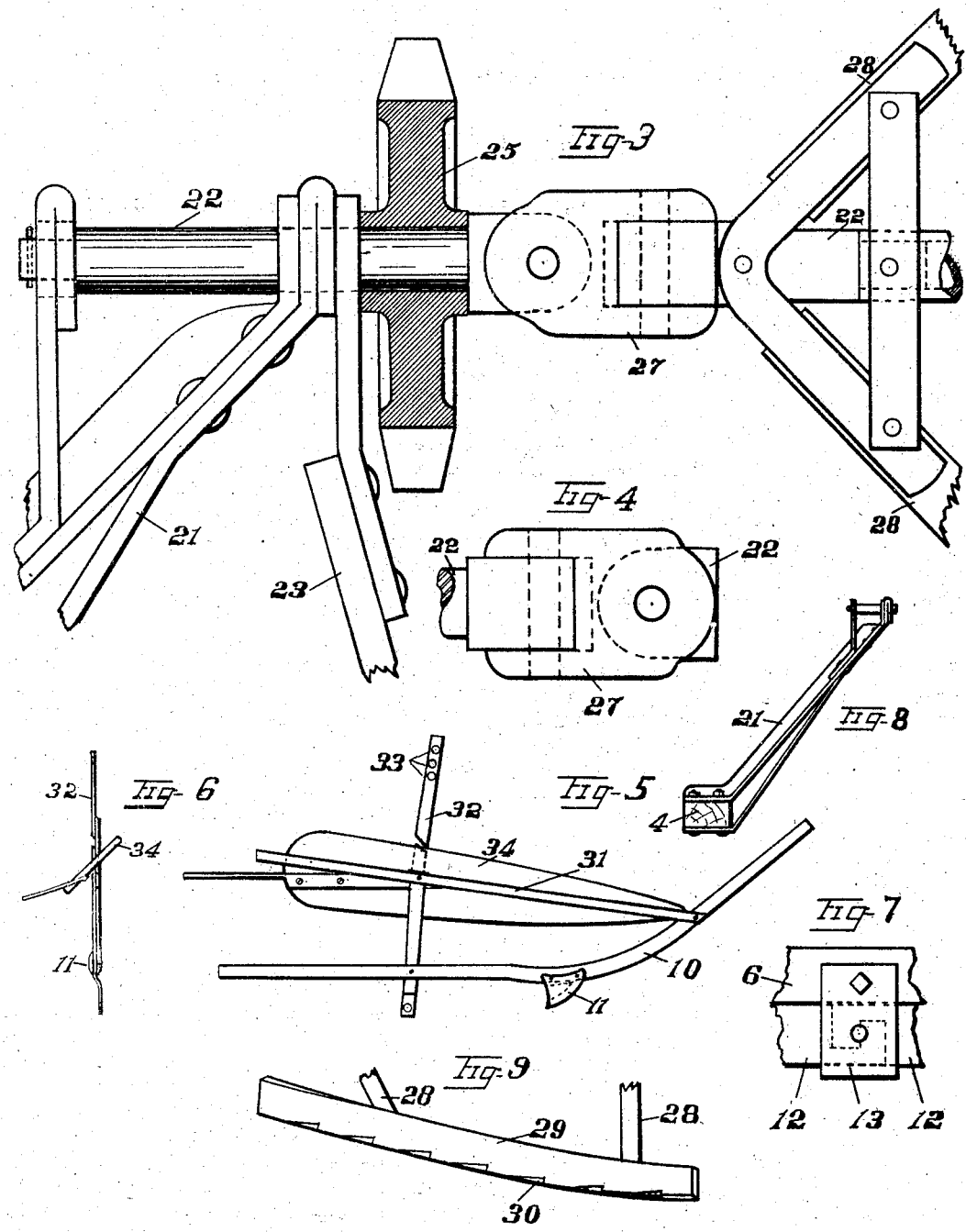

UNITED STATES PATENT OFFICE.

WILLIAM N. WHITELY, OF SPRINGFIELD, OHIO.

HARVESTING-MACHINE.

SPECIFICATION forming part of Letters Patent No. 772,486, dated October 18, 1904.

Application filed August 20, 1903. Serial No. 170,182. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Harvesting-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in harvesting-machines, more particularly as an attachment to the usual form of mowing-machines, the object of my invention being to harvest grass, clover-seed, and small cereal crops, and is particularly adapted for doing the work ordinarily done by self-rake reapers, but in a much cheaper manner, and as my attachment is adapted to all the principal makes of mowing-machines in use by means of it the expense of an additional machine is saved. I attain these objects by the mechanism illustrated in the accompanying drawings, in which—

Figure 1 is a plan view of a mowing-machine equipped with my improvements. Fig. 2 is a side elevation of same, showing more clearly the manner of communicating motion from the truck portion of the machine to the reeling mechanism, also the support for the grassward end of the reel. Fig. 3 is a side elevation, partly in section, showing the supporting mechanism for the stubbleward end of the reel-shaft, also the universal-joint connection in said shaft to allow the reel to operate at an angle to the finger-bar, as shown in Fig. 1. Fig. 4 is a detail view of the universal-joint connection for the reel-shaft. Fig. 5 is a detail side elevation of the divider secured to the grassward end of the finger-bar, also the connection between said divider and the support for the grassward end of the reel. Fig. 6 is a detail rear view of the parts shown in Fig. 5. Fig. 7 is a detail plan view of the clamp connecting the two portions of the transverse bar together and to the finger-bar. Fig. 8 is a detail side elevation of the supporting-bracket for the stubbleward end of the reel-shaft. Fig. 9 is a detail side elevation of the reel-slat, showing the notches thereon to engage the crop and incline it stubbleward.

Similar numbers refer to similar parts throughout the several views.

In said drawings, 1 1 are the main driving and supporting wheels. 2 is the main axle passing through and supported by said wheels. 3 is the main frame mounted on and supported by said axle 2.

4 is the tongue attached to the main frame 3 and by which the machine is drawn over the ground.

5 is the inner shoe pivotally connected to the truck portion of the machine. Rigidly connected to the shoe 5 is the finger-bar 6, which extends grassward from the truck portion of the machine. To said finger-bar 6 is rigidly connected a series of guard-fingers 7, through which reciprocates the knife 8, which severs the stalks. To the grassward end of said finger-bar 6 is secured the shoe 9, to which is secured the divider 10 by means of the socket 11 fitting over the point of said shoe 9, as shown in Fig. 2. To the rearward edge of said finger-bar 6 is secured the transverse bar 12 by means of the clamp 13, as shown in Figs. 1 and 7. To said transverse bar 12 is riveted or otherwise secured a series of slats 14, as shown in Fig. 1, forming a slatted platform, said slats extending rearwardly, the forward portions of said slats 14 sliding on the stubble, the rearward portions of said slats 14 curved upwardly, preferably formed each with the flat face of its upturned rear end on a plane at right angle to the line of draft, as shown in Fig. 2, appearing as a series of steps from the grassward to the stubbleward side of the platform, as shown in Figs. 1 and 2, the stubbleward slats longer than the grassward slats for side-delivery purposes, so as to form an angle with the finger-bar, that the accumulated cut crop may be discharged from the slatted platform stubbleward thereof and in rear of the truck portion of the machine.

When cutting heavy, green, wet, tangled, or matted crops, which lie heavily on the slatted platform, I have found it necessary to agitate and move the rearward portions of the slats 14 upward and allow them to drop downward, and in this way the heavy, wet, matted, and tangled crop is started to roll stubbleward on said platform. To accomplish this, I connect or tie together the rearward curved-upward ends of a predetermined number of said slats 14, as shown in Figs. 1 and 2, by means of the link or yoke 15 or by other suitable means that will accomplish the purpose desired—i. e., to raise up the rearward ends of said slats 14 and allow same to drop backward, so as to agitate the accumulated cut crop on the platform. To said connecting link or yoke 15 I attach a cord or link 16, which extends forward to within reach of the operator. The forward end of said cord or link 16 may be connected to any suitable point on the truck portion of the machine, where the operator can operate same either by hand or foot when desired or found necessary to agitate and start the accumulated cut crop on the platform to roll and move stubbleward on said slatted platform.

When cutting heavy, green, matted, or tangled crops, that when cut fall and lie heavily on the slatted platform, I find it necessary to use an agitating device such as described or other equivalent means to start the crop to roll and move stubbleward on said slatted platform and be delivered stubbleward of said slatted platform.

To the seat-support 17 is secured the rake-arm 18 by means of the clamp-bracket 19, as shown in Fig. 1. To the rearward end of said rake-arm 18 is secured in any suitable manner a series of downwardly-projecting teeth $19^a$, preferably flexibly constructed, as shown in the drawings in Figs. 1 and 2, said teeth $19^a$ being so connected to said rake-arm 18 as to allow said teeth $19^a$ to incline rearward and stubbleward to avoid breakage in the event of striking obstructions and after said obstructions have been passed to again resume their normal working position. This rake is for the purpose of bunching crops cut for seed or to hold the crop at the corner in turning in the operation of windrowing any crop. The rake is retained in an elevated position when windrowing. On the grassward end of the clamp-bracket 19 is journally mounted the lever 20, which extends rearwardly and is rigidly connected to the rake-arm 18, as shown in Fig. 1. By means of said lever 20 said rake-arm 18 and teeth $19^a$ may be raised upwardly when desired by the operator to discharge the accumulated cut crop from said slatted platform, at the stubbleward side thereof, in bunches in rear of the truck portion of the machine, so that the delivered crop is out of the way of the team and machine when cutting the next swath. The object in setting the rake at a wide angle to the platform, with the rear teeth $19^a$ adjacent thereto, as shown in Fig. 1, is for the purpose of collecting the bunch partially on the slatted platform and with a portion resting on the ground, so as to facilitate the quick rolling of such crops as may be suitably bunched. This result will obtain because the part collecting and resting against the angle of the rake upon the ground will have a tendency to at once start rolling on the raising of the rake, thus assisting in discharging the accumulation resting on the platform, which is intertwined and homogeneous with the portion on the ground. The rear tooth of the rake being adjacent to the platform prevents straggling or dribbling loose of little clumps of stalks.

To the tongue 4 is detachably secured the clamping-bracket 21, as shown in Figs. 1, 3, and 8, said bracket inclined upwardly and grasswardly from said tongue 4, the grassward end of said clamping-bracket 21 journally supporting the reel-shaft 22, so as to allow said shaft 22 to freely rotate in said bracket 21. In order to more securely support the reel-shaft 22, I employ a brace-bar 23, as shown in Figs. 1, 2, and 3, its lower end supported by the main axle 2 or by the grassward driving and supporting wheel, its upper end forming a support for said reel-shaft 22, as shown in Figs. 1, 2, and 3. In addition to said brace-bar 23 forming a support for the reel-axle 22 it also serves to keep the reel-driving chain 24 taut.

Mounted upon and secured to the reel-shaft 22 I employ a toothed wheel 25, as shown in Figs. 1, 2, and 3, from which extends rearwardly the chain 24 or cable, which engages with and receives its motion from a toothed wheel 26, which is mounted upon and secured to the grassward end of the main axle 2, thus communicating motion in the right direction to the reeling mechanism, and while I have shown in the drawings toothed sprocket-wheels for the driver and driven wheels and a link chain 24 communicating motion from the driver to the driven wheel it is evident that other means may be employed to communicate motion from the main axle 2 or master-wheel 1 to the reeling mechanism to accomplish the same result and come within the scope of my invention. Connecting the two portions of said reel-shaft 22 is the universal-joint connection 27, by means of which the reel, which is composed of the reel-arms 28 28 and reel-blades 29 29, may be set and operated at an angle in line with the finger-bar 6 or at an angle across the path of the machine that the reel-blades 29 29 may more certainly draw the stalks rearward and when cut deliver same on the slatted platform crosswise of the slats 14 of the platform, so as to start and assist them to move stubbleward on said slatted platform.

It will be observed in my construction of the reel-blades 29 that in order to enable said blades 29 to better take hold of and exert more influence on the cut crop to incline it stubbleward as delivered on the slatted platform I prefer to employ a series of notches 30 in the outer edges of said blades 29, as shown in Figs. 1, 2, and 9, said notches being so formed that as said blades 29 contact with the crop the inclination is to move same stubbleward as it is delivered on the slatted platform, said notches 30 being formed at an angle to the face of said blade 29, as shown in the drawings, as it is believed that a blade so formed will exert a greater influence on the crop to incline and start it stubbleward than if said reel-blades were made smooth without the notches 30 and more particularly in certain kinds and conditions of crops.

Rigidly connected to the outer shoe 9 and extending upwardly and connected to the divider-rail 31 is the reel-post 32. In the upward end of said reel-post 32 is journally supported the grassward end of the reel-shaft 22. The object of said reel-post 32 is to support the grassward end of said reel-shaft 22 and said reel-post 32 being connected to and supported by the outer shoe 9 of the finger-bar 6. Said reel participates in all the up-and-down movements of said finger-bar 6 in passing over the ground, and by said support the grassward ends of the blades 29 are prevented from catching or striking the guards 7 of said finger-bar when the machine is passing over the ground. In the upward end of said reel-post 32 is a series of holes 33 for the grassward end of said reel-shaft 22 for the purpose of adjusting the grassward end of said reel-shaft 22 upward or downward, as desired. Secured to the divider-rail 31 is the divider-board 34, the plane of said board 34 inclined stubbleward and rearward, so as to exert an influence on the cut crop falling on same to move it rearward and stubbleward.

It will be observed in my construction that I employ a triangular-shaped slatted platform connected to the finger-bar and which is adapted to slide on the stubble, and I also employ a reeling mechanism operating over the finger-bar and slatted platform. The object of said reeling mechanism is to reach out, take hold of, and incline rearward and stubbleward the crop to be cut, so that when said stalks are severed by the cutters they will fall on said slatted platform crosswise of the slats of said platform with the heads of said crop inclined stubbleward. I have found the reeling mechanism very valuable and essential when harvesting heavy crops of grain or grass and where the crop leaned away from the cutters or the wind blowing in the same direction the machine was moving. Under such conditions and without the reeling mechanism the tendency of the crop as cut would be to fall forward on the uncut crop; but by means of the reeling mechanism the heads of the crop to be cut are lifted upward in advance of the cutters and inclined rearward, so that when cut the crop drops on the slatted platform, as desired.

It will also be observed that I employ a crop-collecting mechanism located at the stubbleward side of the slatted platform to collect and hold the crop as cut and until desired to be discharged therefrom by the operator. It will be understood that this device is particularly directed to the purpose of bunching seed-crops. Said collecting mechanism is adjustable and can be raised and lowered at the will of the operator that the crop may be discharged by the forward motion of the machine. I also employ a divider located at the grassward side of the finger-bar, its purpose being to separate the cut from the uncut crop and incline the cut crop rearward and stubbleward on the slatted platform.

The reeling mechanism is driven automatically by any suitable gearing on the truck portion of the machine, and by the aid of said reeling mechanism oats, wheat, clover, flax, &c., may be successfully harvested with equal facility, the blades of the reel acting upon the long stalks to draw them against the cutters and to deposit them when cut upon the stubble and slats of the platform, and as the cut crop is deposited upon said slatted platform with the heads inclined rearward and stubbleward when desired to be used for the particular crops for which it is adapted the rake or crop-collecting mechanism will arrest the cut crop and gather and hold it on said platform until the rake or crop-collecting mechanism is raised by the operator, when the accumulated cut crop passes off stubbleward of said platform and rearward of the truck portion of the machine.

By means of my construction grain and grass crops can be harvested in a much cheaper manner than heretofore, the stubble being used at all times to assist the work of collecting and delivering the cut crop, as the slatted platform is not raised from the stubble during the operation of the machine, but continuously slides on the stubble.

It will be observed that I support the stubbleward end of the reel by a suitable clamping-bracket detachably secured to the tongue of the machine, the end of said bracket extending grassward from the tongue. I also employ a brace-bar extending from the reel-shaft to the main axle of the machine or to the grassward main driving and supporting wheel of the machine. I consider the bracket connection to the tongue and the brace-bar from the main axle or master-wheel to the reel important features of my invention, as by their use the machine is simplified, and while my improvements are more particularly adapted to all kinds of front-cut two-wheeled hinged-bar mowing-machines in use the entire attachment—that is, the divider located at the grassward end of the finger-bar, the slatted platform, the crop-collecting mechanism which is supported on the truck portion of the machine, and a portion of the reeling mechanism—will apply to all makes of mowing-machines.

I prefer in my construction to set the reel at an angle across the path of the machine, so that the blades of the reel may more certainly and effectually draw the stalks of the crop to be cut crosswise of the slats of the platform as they are cut and delivered on the slatted platform in rear of the cutters.

I have found in the operation of harvesting-machines equipped with my invention that better results are obtained by attaching the reel-blades to the reel-arms in screw form, so that the grassward end of the reel-blades may reach and engage the crop first, and as the reel revolves to engage other stalks as the reel-blades approach the stubbleward end of the finger-bar, thus delivering the cut stalks crosswise of the slatted platform, and as I provide a universal-joint connection on the reel-shaft with its driving mechanism it will be observed that the grassward end of the reel may be set forward or backward and upward and downward at its grassward end, as desired.

What I claim, and desire to secure by Letters Patent, is—

1. In a side-draft, front-cut, two-wheeled, hinged-bar mowing-machine, in combination, a tongue connected to the frame to guide the machine, a finger-bar, a knife, an automatically-actuated reel, a supporting mechanism for the stubbleward end of said reel detachably clamped to said tongue and extending grassward and upward therefrom, a cross pivotal joint in the reel-axle, a support for the grassward end of said reel connected to the grassward end of said finger-bar, for the purposes shown and described.

2. In a side-draft, front-cut, two-wheeled, hinged-bar mowing-machine, in combination, a tongue connected to the frame to guide the machine, a finger-bar, a knife, a reel, a supporting mechanism for said reel detachably connected to the machine and extending grassward and upward therefrom to support the stubbleward end of said reel, a brace-bar extending from the master wheel or axle to said reel-support to support the stubbleward end of said reel mechanism and hold the reel-driving chain in proper relation to said reel-support and the master wheel or axle.

3. In a side-draft, front-cut, two-wheeled, hinged-bar mowing-machine, in combination, a finger-bar, a triangular-shaped side-delivery slatted platform connected to said finger-bar and adapted to continuously slide on the stubble, an automatically-actuated reeling mechanism located over the finger-bar, the grassward ends of the blades of said reel, arranged to operate rearward of the stubbleward ends to cross the slats of said platform at an oblique angle to force the crop onto the stubble and slats of said platform crosswise, means to agitate the rearward ends of a predetermined number of the slats of said platform as the machine moves forward to force the crop sidewise off said platform for the purposes described.

4. In a side-draft, front-cut, two-wheeled, hinged-bar mowing-machine, in combination, a finger-bar, a triangular-shaped side-delivery slatted platform connected to said finger-bar and adapted to continuously slide on the stubble, an automatically-actuated reeling mechanism located over the finger-bar and said platform, the grassward ends of the blades of said reel extending rearward of the stubbleward ends of said blades to deliver the stalks crosswise of the slats of said platform for the purposes described.

In testimony whereof I affix my signature in presence of two witnesses.

WILLIAM N. WHITELY.

Witnesses:
JOHN L. GILLIGAN,
ROBERT WEISKOTTEN.